US005196246A

United States Patent [19]
Kauss et al.

[11] Patent Number: 5,196,246
[45] Date of Patent: Mar. 23, 1993

[54] WALL DECORATING SYSTEM

[75] Inventors: Del A. Kauss, Maplewood; Patrick J. Hager, Woodbury; Janet T. Keller, Eagan, all of Minn.

[73] Assignee: Minnesota Mining and Manufacturing Company, St. Paul, Minn.

[21] Appl. No.: 702,605

[22] Filed: May 17, 1991

[51] Int. Cl.$^5$ .............................. B32B 7/12; B44C 5/04
[52] U.S. Cl. ....................................... 428/39; 428/343; 428/355; 428/187; 524/547; 524/556; 526/240
[58] Field of Search ................. 524/547, 556; 526/240; 428/343, 355, 39, 79, 187

[56] References Cited

U.S. PATENT DOCUMENTS

| | | | |
|---|---|---|---|
| 3,445,546 | 5/1969 | Pledger, Jr. | 260/897 |
| 3,691,140 | 9/1972 | Silver | 260/78.5 |
| 3,857,731 | 12/1974 | Merrill, Jr. et al. | 117/122 PA |
| 3,869,422 | 3/1975 | Dawes et al. | 260/42.47 |
| 3,937,854 | 2/1976 | Shank, Jr. | 427/29 |
| 4,161,562 | 7/1979 | Yoshikawa et al. | 428/215 |
| 4,279,344 | 7/1981 | Holloway, Jr. | 206/631 |
| 4,481,254 | 11/1984 | Fukushima et al. | 428/329 |
| 4,615,941 | 10/1986 | Lu | 428/327 |
| 4,653,752 | 3/1987 | Miller | 273/60 B |
| 4,735,837 | 4/1988 | Miyasaka et al. | 428/40 |
| 4,805,327 | 2/1989 | Buckley | 40/159 |
| 4,807,922 | 2/1989 | Glover | 296/136 |
| 4,835,025 | 5/1989 | Thompson et al. | 428/34.2 |
| 4,897,136 | 1/1990 | Bailey et al. | 156/145 |
| 4,900,604 | 2/1990 | Martinez et al. | 428/79 |
| 4,916,025 | 4/1990 | Lu | 428/516 |
| 4,983,436 | 1/1991 | Bailey et al. | 428/40 |
| 4,994,322 | 2/1991 | Delgado et al. | 428/343 |
| 5,037,877 | 8/1991 | Kerherve | 524/556 X |

FOREIGN PATENT DOCUMENTS 371635 6/1990 European Pat. Off.

OTHER PUBLICATIONS

Surlyn, *Industrial Extrusions Manual*, pp. 1–24.
Surlyn TM, *Ionomer Resin*, "Increase Packaging Efficiency and Package Performance", pp. 1–31.

*Primary Examiner*—George F. Lesmes
*Assistant Examiner*—D. R. Zirker
*Attorney, Agent, or Firm*—Gary L. Griswold; Walter N. Kirn; Jeffrey J. Hohenshell

[57] ABSTRACT

An improved wall decorating system is disclosed that utilizes a film comprising about 60–98% by weight ionomer resin that is a copolymer of ethylene and acrylic acid or methacrylic acid neutralized by a metal cation, the resin having a melt flow index greater than about 10 and about 2–40% by weight of a filler material, wherein the film has a thickness of between 0.050 and 0.127 mm. The wall decorating system also may include an improved adhesive comprising between about 60–100% by weight of hollow, polymeric, acrylate, inherently tacky, infusible, solvent-insoluble, solvent-dispersible, elastomeric pressure-sensitive adhesive microspheres having a diameter of at least 1 micrometer, and between about 0–40% by weight of a non-spherical polyacrylate adhesive.

32 Claims, 5 Drawing Sheets

WALL DECORATING SYSTEM

TECHNICAL FIELD

The invention relates generally to wall decorating systems and more particularly to a wall decorating system having self-adherent appliques which press onto a backing or substrate sheet or to substrates such as walls, doors or furniture to create a flexible, decorative scene that is easily changed by repositioning the appliques on the backing or substrate sheet in a repositionable manner.

BACKGROUND

There are many types of prior art wall decorating systems such as paint and/or wallpapering. Both paint and wallpaper, however, are permanent and are not reusable. To significantly change the appearance of a painted or wallpapered wall, the wall typically is repainted or wallpapered with a different wallpaper or paint. Such processes are generally expensive and time consuming. Additionally, paint is messy to apply and wallpaper is difficult to install.

U.S. Pat. No. 4,900,604 to Martinez et al. (the entire contents of which are herein incorporated by reference) is directed to adhesive wall decorating systems previously sold under the name "Decorate-It!" TM Room Decorating System. That system comprises substrate or "backing" sheets and a plurality of pre-cut self adherent appliques. The backing sheets and appliques are coated with a repositionable adhesive to afford rearrangement of the appearance of a wall or other surface by changing the relative positions of the backing sheet and appliques.

The appliques and backing sheets described in Martinez et al. were constructed from a thin film or sheet of flexible material, such as plasticized polyvinyl chloride (PVC) based material. The film should be conformable to adjust to irregularities and discontinuities in substrates such as light switch frames along wall surfaces or irregularly textured surfaces.

Figure 6A:
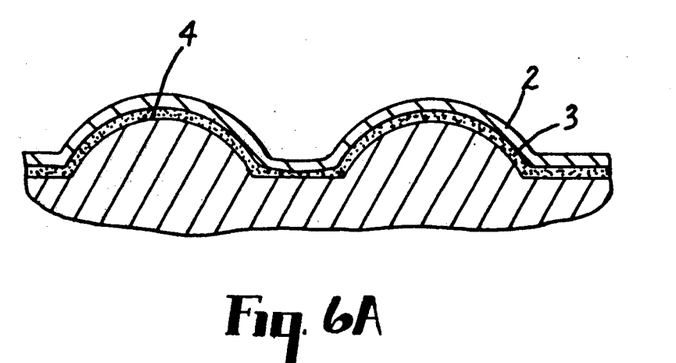
FIG. 6A is a sectional view, which is not to scale, of an adhesive coated thin film just after it is initially manually pressed against an irregular surface.

Conformance as discussed in this case has two basic elements. First, the film must be capable of initially modifying its shape so that it will accommodate irregular surfaces over which it is stretched FIG. 6A illustrates a thin film 2 having an adhesive 3 coated over one side that adheres the film 2 to an irregular substrate or surface 4, such as a wallpapered or painted wall. Initially, PVC films are highly conformable and may conform to an irregular surface.

The ability of a film to initially conform over an irregular surface can be measured by evaluating the hysteresis of the film. Hysteresis is a measurement of the energy lost or dissipated during cyclic deformation of a film sample. The greater the amount of energy lost (hysteresis), the more conformable the film. While PVC films exhibit excellent initial hysteresis properties, they suffer other drawbacks as will be illustrated below. Unfilled ionomeric polymer-based films generally have unacceptably low hysteresis values. Because they do not provide good initial conformance to irregular surfaces, unfilled ionomeric-polymer films are not desirable.

The second important element to conformance as described herein is the Long-Term Elastic Recovery of the film. Long-Term Elastic Recovery is discussed below in the detailed description of the preferred embodiment. Polyvinyl chloride (PVC) films used to construct the appliques and backing sheets described in Martinez et al. are highly plasticized to give them flexibility for use as appliques and backing sheets. The PVC is typically processed by premixing in plasticizers and stabilizers, then sheeting out the film in a calendering operation. When the film is laminated to a liner, the film is held in a stretched conformation that is only released when the film is removed from the liner. In later use, such as when the backing sheets or appliques are applied to a wall or other surface, the film may be additionally manually stretched. After time passes, the film "remembers" its relaxed state; and the film typically shrinks or contracts, particularly at elevated temperatures.

Figure 6B:
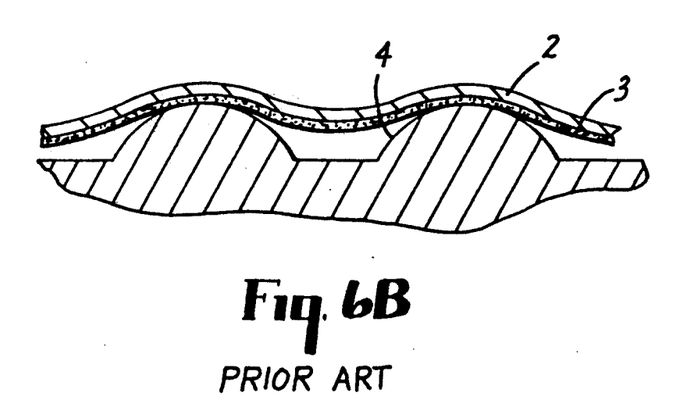
FIG. 6B is a sectional view similar to FIG. 6A of an adhesive coated PVC based thin film after it has been manually pressed against an irregular surface and after a great deal of time has passed.

FIG. 6B illustrates the relationship between a substrate 4 and an adhesive coated PVC film 2 after time has passed. The film 2 remembered its relaxed state and shrank or contracted. Shrinkage of the polyvinyl chloride (PVC) based appliques and backing sheets contributes to adhesive shear failure resulting in separation between the appliques, backing sheets and the substrate (e.g. the backing sheet or applique falling off the wall). This phenomenon is illustrated in FIG. 6B which shows reduced contact between the adhesive 3 and the irregular surface 4. The reduced surface area of adhesive 3 and surface 4 in contact results in increased stress in the adhesive layer 3 that tends to result in the film 2 and adhesive 3 separating from the surface 4 (e.g. the applique or backing sheet falling off the wall).

Additionally, over time, plasticizers or other additives for polyvinyl chloride (PVC) based materials tend to migrate or leach from the bulk material resulting in a general degeneration of mechanical properties such as embrittlement and reduced flexibility. Also, polyvinyl chloride (PVC) based materials generally release chlorinated by-products during combustion.

Ionomeric resins (such as the Surlyn™ family of resins, commercially available from E. I. DuPont de Nemours Co.) have been mainly exploited as a tough covering for sporting equipment such as golf balls, and as a heat-shrinkable plastic wrap component. In some cases, the cold temperature properties of ionomers have proved useful, as in U.S. Pat. No. 4,161,562. Ethylene-co-methacrylic acid copolymers have been blended, as in U.S. Pat. Nos. 3,445,546 and 3,869,422, and more recently U.S. Pat. No. 4,916,025. In the latter patent, Surlyn™ material was used only as a heat sealing outer layer, optionally blended with other resins to reduce cost. Given the recommended uses for Surlyn™ resins, one would not expect the filled material to act as a stand-alone conformable film.

U.S. Pat. No. 4,279,344 describes a peelable, heat-sealable packaging laminate. The inner sealing layer is formed from polypropylene or polyethylene/polypropylene copolymer blended with 15-35% Surlyn™ ionomer. The heat-sealed Surlyn™ film bonds are described as hand peelable.

U.S. Pat. No. 4,835,025 describes a barrier laminate for essential oils/flavorings composed of paper substrate coated with nylon, which is coated with Surlyn™ resin and a coating of olefin (polyethylene) overall. The intermediate nylon or Surlyn™ film layer may be pigmented using a pigment such as $TiO_2$ at 0.5-15%.

U.S. Pat. No. 4,653,752 describes a sport ball comprised of a plastic shell covered with a sewn cover. The shell is a blend of Surlyn™ resin with 25-50% ethylene-co-vinyl acetate (EVA). The Surlyn™ resin is described as providing strength and durability, while the EVA provides softness. These properties are noted for bulk-like materials such as spherical balls. Increasing EVA content leads to more rubbery, softer materials, while increasing Surlyn TM resin levels leads to harder, more resilient materials. With respect to additives, small amounts of other plastic polymers may be added without changing the characteristics significantly, and glass may be added as well.

DISCLOSURE OF THE INVENTION

The present invention provides an improved adhesive wall decorating system which utilizes an improved flexible and conformable ionomeric resin-based sheet material to construct the appliques and backing sheets. The improved material used to construct the appliques and backing sheets is adapted to receive indicia or graphics on one side and a repositionable adhesive on the other side, and provides a sheet which exhibits improved characteristics such as long-term dimensional stability, shrinkage resistance and other mechanical properties, which exhibits reduced long-term dimensional sensitivity to elevated temperatures and increased long-term resistance to thermal distortion, which is free of volatile/migrating additives or plasticizers that eventually lead to a reduction in mechanical properties such as embrittlement, which is recyclable, which is free of chlorinated by-products when incinerated, and which reduces the likelihood of adhesive shear failure for the adhesive used to attach the appliques and backing sheets to a substrate or another surface.

The appliques and backing sheets of the present invention are constructed from ionomeric polymer resins having a melt flow index of greater than 10. Such films are flexible and conform to irregular surfaces (e.g. such as painted or wallpapered walls, particularly textured surface walls) when produced in film form having a thickness of between about 0.050 and 0.127 mm, when the ionomeric polymer resin is mixed with a filler that is not an ionomeric polymer. The films used in conjunction with the invention further exhibit superior long-term stability (both thermal and dimensional) in use. The appliques and backing sheets of the present invention tend to remain in place once applied to uneven or textured surfaces such as painted or wallpapered walls. In addition, the films of this invention contain no migrating plasticizers or other leachable additives, and can be conveniently and efficiently disposed of.

BRIEF DESCRIPTION OF THE DRAWING

The present invention will be further described with reference to the accompanying drawing wherein like reference numerals refer to like parts in the several views, and wherein.

DETAILED DESCRIPTION OF THE PREFERRED EMBODIMENT

Figure 1:
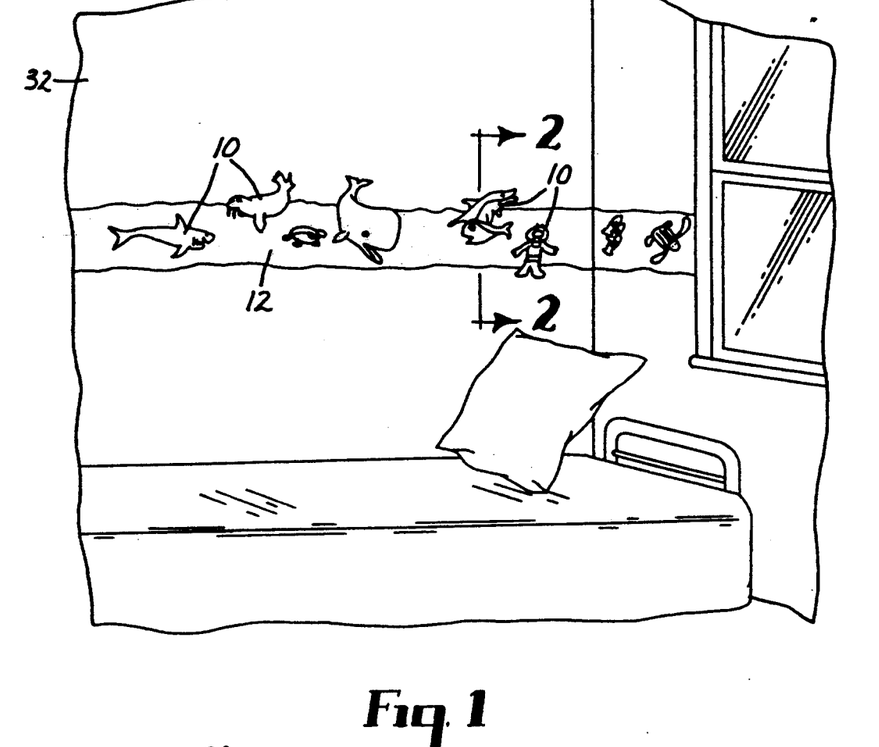
FIG. 1 is a perspective environmental view of an adhesive wall decorating system of the present invention, illustrated as applied on two walls in a child's bedroom.

Referring now to FIG. 1 of the drawing, there is shown an improved versatile adhesive wall decorating system according to the present invention. The wall decorating system has at least one and preferably a plurality of self-adherent appliques 10 which can be attached to one or more substrate or "backing" sheets 12 by a reusable, self-contained, non-permanent or "repositionable" adhesive that affords repositioning of the appliques 10 after installation. The appliques 10 provide complementary decorative images which cooperate with one another and with the backing sheets 12 to create a thematic decorative scene that can be easily rearranged.

The present invention provides an improved decorating system that affords a relatively inexpensive alternative to decorating solely with paint and/or wallpaper, both of which are relatively permanent once applied. In contradistinction, the improved decorating system remains removable or rearrangeable once in place and is not as messy, time consuming or difficult to apply as paint and wallpaper. The decorating system's use of a repositionable adhesive 14 beneficially ensures that the system can be installed quickly and efficiently without marring walls or damaging painted surfaces. Moreover, the usage of a repositionable adhesive 14 allows decorative components of the system to be removably attached to an underlying surface without requiring pins, tacks, or similar sharp attachment means. The decorating system is particularly suitable for use in a youngster's room where it will spark the child's creative development by enabling the child to express his or her imagination by rearranging the decorative appliques into various decorative scenes.

The repositionable and easily changeable nature of the invention beneficially allows different appliques to be used as a child grows and changes interests. For example, the scene illustrated in the drawings can be replaced by airplane or sports related appliques so that the wall decorating system retains its appeal over the years. The wall decorating system can also be updated throughout the year by utilizing appliques relating to holidays or to the four seasons.

Figure 2:
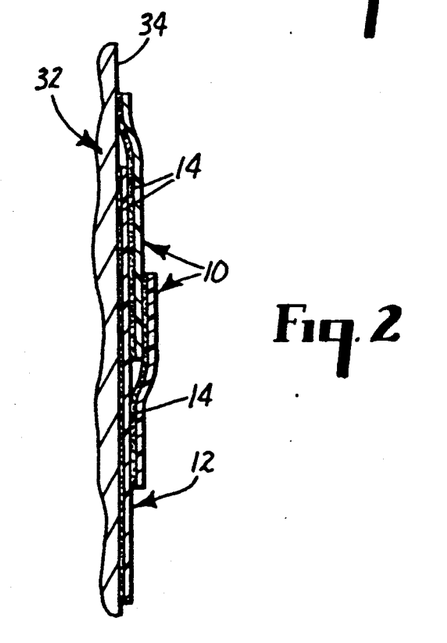
FIG. 2 is an enlarged cross-sectional view taken approximately along line 2—2 of FIG. 1, illustrating a first applique in overlapping relation with a wall, and a second applique which overlaps the first and the backing sheet.
Figure 3:
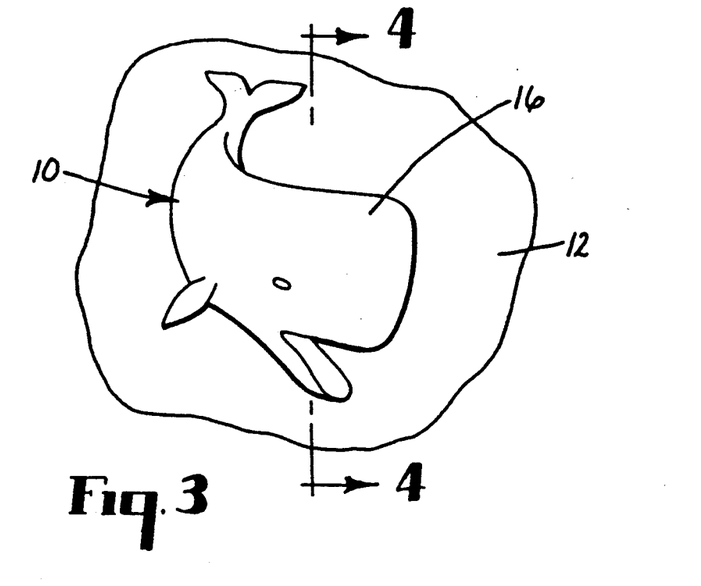
FIG. 3 is an enlarged front elevational view of an applique and the backing sheet.
Figure 4:
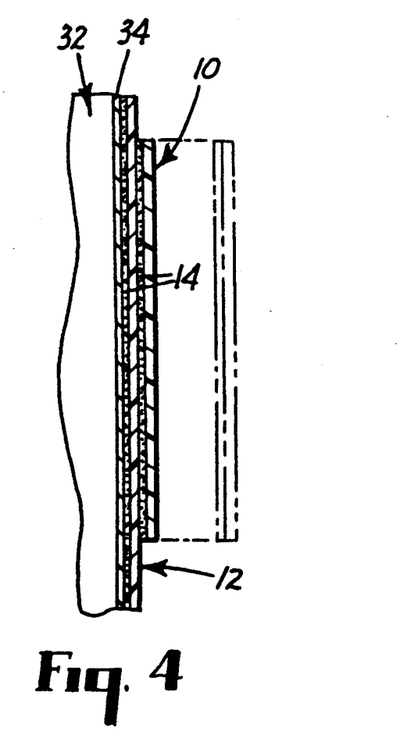
FIG. 4 is a cross-sectional view taken approximately along line 4—4 of FIG. 3, illustrating adherence of the backing sheet to a painted wall.
Figure 5:
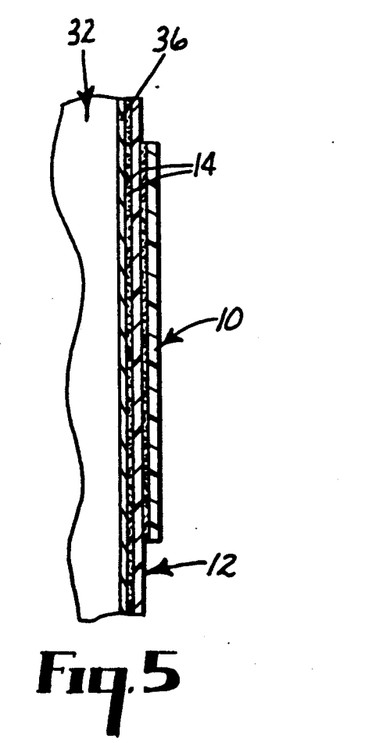
FIG. 5 is a cross-sectional view similar to FIG. 4, illustrating adherence of the backing sheet to a wallpapered wall.

In accordance with the present invention, the appliques 10 and backing sheets 12 comprise relatively thin films having a repositionable pressure sensitive adhesive coating 14 on one side (FIGS. 2, 4 and 5). The films adapted for use with the present invention comprise:

a) about 60-98% by weight ionomeric polymer resin that is a copolymer of ethylene and acrylic acid or methacrylic acid neutralized by a metal cation and having a melt flow index greater than about 10, and b) about 2-40% by weight of a filler material that is not an ionomeric polymer, wherein the film has a thickness of between 0.050 and 0.127 mm.

These films provide significant property advantages in thermal and dimensional stability and may also exhibit superior aging and decreased embrittlement characteristics as compared to the standard PVC films used to construct the PVC films described in U.S. Pat. No. 4,900,604 to Martinez et al. and previously sold under the name "Decorate-It!" TM Room Decorating System. These advantageous properties are available even though the ionomeric resin-based films need not contain volatile or migrating additives or plasticizers. Films as described herein are comparatively benign from an environmental standpoint, because they produce no chlorinated by-products from combustion. This is an additional advantage when the decorating system is used in residential and other habitable interior uses, where it is desirable to reduce the amount of harmful chemicals released in the event of a fire.

Ionomeric resin-based films as described herein also are more simple to make than PVC films, because the number and degree of premixing of ingredients is drastically reduced in making the conformable film. Because there are fewer components in the present films, these films may be more readily recycled than other films currently commercially available.

The ionomeric polymers used to construct the appliques and the backing sheets 12 of the present invention are copolymers of ethylene with acrylic acid or methacrylic acid, neutralized with a metal cation such as zinc, sodium, or magnesium. The particularly preferred ionomeric polymers are copolymers of ethylene with methacrylic acid. The ionomeric polymers effective for use in this invention have a melt flow index of at least about 10. Preferably, the ionomeric polymer has a melt flow index of at least about 12. Melt flow index is determined by following the recognized and well-known protocol set forth in ASTM D 1238. E. I. DuPont de Nemours Co. produces a line of neutralized ethylene-co-methacrylic acid ionomeric polymers under the name Surlyn TM that are acceptable for the present use, provided that the selected resin has the requisite melt flow index. A particularly preferred resin is Surlyn TM 1702 resin, which has a high melt flow index (14.0), a low flexural modulus (152 N/mm$^2$), and good low temperature flexibility.

A small amount of filler material is necessary to endow ionomer-based films with the required conformable and inelastic properties required in a film product. The typical range of filler material content is from about 5-40% by weight. Preferably the filler material content is about 5-25% by weight, and more preferably about 5-15%.

The filler material may be selected from any material that is distinct in nature from the ionomeric polymer, thus providing the desired flexoral and conformance properties. In its most general sense, the filler may be any material appropriate for mixing in a polymeric resin to be made into a film that is not an ionomeric polymer. More specifically, the filler may be selected from non-reinforcing fillers such as mineral fillers, glass bubbles and the like, or may be selected from polymeric resins. This filler material is preferably selected from pigments, such as TiO$_2$. Often such pigments are provided in a polymeric resin carrier, which is appropriately included as a part of the filler material mass for measurement purposes. Divergent polymeric materials may also be used as the filler material itself, such as ethylene polymers, polypropylene polymers (PP), polyoxyethylene oopolymers (PEO), ethylene-co-acrylic acid (EAA), ethylene-co-methacrylic acid (EMAA), ethylene-co-vinyl acetate (EVA), polypropylene containing 12-18% of ethylene propylene rubber, and the like. Other examples of filler materials are synthetic waxes or mineral oil. Particularly preferred waxes include the ACLYN TM line of low molecular weight ionomeric waxes from Allied Signal, Inc. The ancillary properties of the ultimate film that is formed will be dependent on the nature of the filler material component that is added to the ionomeric resin. For example, when the filler material is a resin that typically forms an elastomeric material, the resulting film of the present invention will tend to be more rubbery in nature and even more tear resistant than the ionomeric film without additive. Films made with a less elastomeric filler, such as polypropylene, tend to be stiffer.

Because the filler materials are selected from different types of substances, it is envisioned that differing compatibilities and propensities of the filler to dominate the physical properties of the ultimate film will be observed. Ideal ranges of filler content may be different from one filler to another.

The appliques 10 and the backing sheets 12 are typically provided at thicknesses of between about 0.050 and 0.127 mm thick. Appliques 10 and backing sheets 12 that are thinner than about 0.050 mm are difficult to handle and do not have significant tear strength advantage over less expensive alternatives. Appliques 10 and backing sheets 12 thicker than about 0.127 mm are not very conformable, and therefore do not provide this advantageous property. Additionally, all other characteristics being the same, appliques 10 and backing sheets 12 thicker than about 0.127 mm are less conformable than thinner films which tends to reduce adhesive contact, reducing bond strength. This tends to result in failure of the decorating system (e.g. the appliques 10 or backing sheets 12 falling off the substrate). Preferably, appliques 10 and backing sheets 12 are provided in thicknesses of between about 0.064 to 0.104 mm, and more preferably between about 0.076 to 0.089 mm.

Films used to fabricate the appliques 10 and backing sheets 12 of the present invention are made by merely dry mixing pellets of ionomeric resin and pellets of pigment, or other selected filler material. The thus dry-blended materials are melted and mixed in a single screw extruder, then die cast to form the final film. The film may optionally be laminated to a carrier web, such as a glossy or matte-finish polyester carrier film, for ease of handling and coating. The caliper control of the extrusion cast film is typically better than for a calendered material.

The ionomeric resin-based films described herein are useful to replace the appliques 10 and backing sheets 12 that were previously constructed from plasticized PVC-based materials. A particularly advantageous characteristic of the ionomeric resin-based films is reduction of later shrinking of the film that can result in adhesive failure when the composite backing (meaning the film) no longer corresponds to the dimension of the substrate to which the composite is adhered.

Figure 6C:
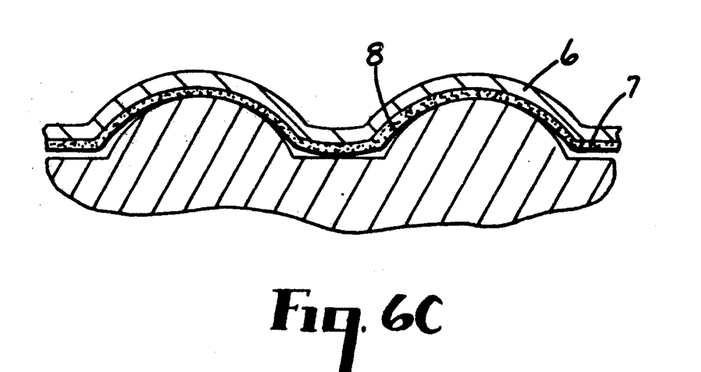
FIG. 6C is a sectional view similar to FIG. 6A of an adhesive coated thin film used to construct an applique or backing sheet of the present invention after it is initially pressed against an irregular surface and after a great deal of time has passed.

FIG. 6C is a sectional view similar to FIG. 6A of an adhesive 7 coated on a thin film 6 used to construct an applique 10 or backing sheet 14 of the present invention after it is initially pressed against an irregular surface 8 and after a great deal of time has passed. In contrast to the prior art shown in FIG. 6B, the thin film used to construct the backing sheets 12 and appliques 10 reduce the shrinkage of the film and thereby reduce the likelihood of adhesive failure over time. A comparison of FIGS. 6B and 6C illustrates that, over time, the thin film 6 used to construct an applique 10 or backing sheet 14 retain a greature surface area of adhesive 7 in contact with the surface 8 than the prior art PVC films 2.

Referring now to FIGS. 2, 4 and 5, the adhesive 14 coated to the appliques 10 and backing sheets 12 may be selected from any adhesive that may be repeatably adhered to and removed form a substrate without substantial loss of adhesion capability. An example of such an adhesive 14 is disclosed in U.S. Pat. No. 3,691,140 to Silver, which relates to solid tacky microspheres. Repositionable adhesives are also known in which microspheres contained in the adhesive are non-tacky. A disclosure of this type of adhesive is provided in U.S. Pat. No. 4,735,837 to Miyasaka. Repositionability may also be achieved by other techniques, such as pattern coating of the adhesive. Preferably, the repositionable adhesive 14 provided on the film comprises between about 60-100% by weight of hollow, polymeric, acrylate, inherently tacky, infusible, solvent-insoluble, solvent-dispersible, elastomeric pressure-sensitive adhesive microspheres having a diameter of at least 1 micrometer, and between about 0-40% by weight of a non-spherical polyacrylate adhesive. These hollow microspheres are made in accordance with the teaching of European Patent Application 371,635. The non-spherical polyacrylate adhesive may be any conventional pressure-sensitive adhesive. Examples of such adhesives are polymers made from the "soft" monomers such as n-butyl acrylate, isooctyl acrylate, or the like, or copolymers made from a soft component, such as isobutylene, n-butyl acrylate, isooctyl acrylate, ethyl hexyl acrylate, or the like; and a polar monomer such as acrylic acid, acrylonitrile, acrylamide, methacrylic acid, methyl methacrylate or the like. Non-spherical polyacrylate adhesives are commercially available, for example, as the Rohm and Haas Rhoplex TM line of adhesives. Preferably, the non-spherical polyacrylate adhesive is present in the repositionable adhesive at an amount of about 10-35% by weight.

While other repositionable adhesives are generally effective to support films as presently described, the repositionable adhesive comprising hollow microspheres are particularly effective for holding large samples (e.g. backing sheets 12 with a length of approximately fifteen feet, a width of about nine inches, and a thickness of between approximately 0.050 and 0.127 mm) of film to vertical surfaces. This increased holding power is particularly required where the film to be supported has a surface area exceeding about 0.3 square meters. When the repositionable adhesive 14 additionally comprises a non-spherical polyacrylate adhesive, improved anchorage of the total adhesive to the film is observed, resulting in less adhesive residue being left on the substrate after removal. Also, repositionable adhesives comprising non-spherical polyacrylate adhesives exhibit excellent shear adhesion properties, even for highly textured vertical surfaces. These advantageous adhesive properties are obtained without without excessive adhesion to substrates such as painted walls that would result in peeling of the paint off of the wall when the film adhesive composite is removed. Improved anchorage, shear and adhesion properties are also observed for this adhesive when used with other film backings, such as polyvinyl chloride film backings.

The adhesive 14 may alternatively be permanent in nature. Additionally the adhesive 14 may also comprise other adhesive composites including those containing a hot melt adhesive, which would be considered to be a permanent application of the appliques 10 and backing sheets 12.

The films used to construct the appliques and backing sheets 12 of the present invention provide particular advantage in excellent tear strength and conformability. Tear strength is evaluated using standard test methods to determine the Elmendorf tear strength. Thus, while samples of polyvinyl chloride films typically used on the market may exhibit an Elmendorf tear strength in the range of 50 to 200 grams/ply, ionomeric-based films have an Elmendorf tear strength in excess of 280 grams/ply, and preferably greater than 300 grams/ply. The Elmendorf tear strength measurements noted above are taken on 0.076 mm films in the machine direction.

Conformance as discussed herein has two basic elements. First, the film must be capable of initially modifying its shape so that it will accommodate irregular surfaces over which it is stretched. The ability of a film to initially conform over an irregular surface can be measured by evaluating the hysteresis of the film. Hysteresis is a measurement of the energy lost or dissipated when a film sample is stretched and immediately released in a cyclic deformation. The greater the amount of energy lost (hysteresis), the more conformable the film. While PVC films exhibit excellent hysteresis properties, they suffer other drawbacks as will be illustrated below. Unfilled ionomeric polymer-based films have unacceptably low hysteresis values. Because they do not provide good initial conformance to irregular surfaces, unfilled ionomeric-polymer films do not satisfy requirements of the desired conformable films.

The second important element to conformance as desired herein is the Long-Term Elastic Recovery of the film.

Long-Term Elastic Recovery is determined by providing a sample of the resin in a 50.8 mm×1.27 mm by 0.1016 mm film sample. The sample is placed in a tensile tester and stretched 100% in length at a rate of 508 mm/minute. The sample is allowed to remain in the jaws of the tensile tester for 5 minutes or for 10 minutes to equilibrate, then removed and placed in a temperature and humidity controlled chamber at 25° C. and 50% relative humidity. The Long-Term Elastic Recovery is calculated by the following equation:

$$100 - \left[\left(\frac{Y-X}{Z-X}\right) \times 100\right] = \% \text{ recovery}$$

where
  $X$ = unstrained length
  $Z$ = initial strained length, and
  $Y$ = length of sample at some later time "t".

Long-Term Elastic Recovery is evaluated by taking periodic measurements over a 40 hour time period after imposing an initial known strain. Preferably, the film will exhibit a Long Term Elastic Recovery of no more than 80% after 40 hours when the film os 0.1 mm thick and initially held for 5 minutes. Similarly, the film should exhibit no more than 20% recovery after 40 hours when initially held for 10 minutes.

Ionomeric polymer-based films were surprisingly found to recover almost instantaneously from an imposed deformation to a limiting degree, followed over a long time span with almost no additional recovery. This behavior is beneficial for a wall decorating substrate film (such as the film used to fabricate the appliques 10 and backing sheets 12), where one desires the film to be mechanically stable and resist shrinkage which may lead to failure, as in the case of plasticized PVC sheets.

Mechanically, plasticized PVC has excellent initial conformance to irregular surfaces, springing back only slightly less than or equal to 40% for PVC Comparative Example A below, over the initial few minutes of application. However, over longer time spans (1 hour-several days) or at elevated temperatures, PVC suffers considerable creep and elastic recovery which lead to failure by pop-off or lift. Conversely, ionomer-based films according used in the present invention, although rebounding initially to a greater extent (about 50-60%) than PVC, exhibit greatly reduced long-term dimensional changes in comparison. Thus, ionomer-based films according to the present invention, once properly applied, show better stability and conformance than PVC films.

The following examples are presented for illustrational purposes only, and are not intended to limit the scope of the invention.

EXAMPLE 1

86 parts of dry pellets of Surlyn TM 1702 resin from DuPont were mixed with 14 parts of Ampacet TM 11748 pigment, a TiO$_2$ white pigment concentrate in linear low density polyethylene commercially available from Ampecet Corporation. The thus dry-blended materials were melted and mixed in a single screw extruder, then cast to form a 0.076 mm. film on a matte-finish polyester carrier web.

EXAMPLES 2-7

A resin blend is prepared as described in Example 1, and is die cast onto a matte-finish carrier web in varying thicknesses as follows:
Example 2: 0.050 mm
Example 3: 0.064 mm
Example 4: 0.081 mm
Example 5: 0.089 mm
Example 6: 0.102 mm
Example 7: 0.127 mm

EXAMPLE 8-20

Resin blends were prepared as described in Example 1, and were cast onto a matte-finish carrier web at a film thickness of 0.076 mm, according to the following material ratios:

| Example | Surlyn TM 1702 | PP[1] | AMPACET 11748[2] |
|---|---|---|---|
| 8 | 69 | 17 | 14 |
| 9 | 52 | 34 | 14 |
| 10 | 34 | 52 | 14 |
| 11 | 86 Surlyn TM 1706 | — | 14 AMPACET 11748 |
| 12 | 86 Surlyn TM 9020 | PP | 14 |
| 13 | 69 | 17 | 14 |
| 14 | 86 Surlyn TM 1702 | — ULDPE[3] | 14 |
| 15 | 67.5 | 22.5 LDPE[4] | 10 |
| 16 | 45 | 45 | 10 |
| 17 | 67.5 | 22.5 EAA[5] | 10 |
| 18 | 52 | 34 EMAA[6] | 14 |
| 19 | 52 | 34 EVA[7] | 14 |
| 20 | 52 | 34 | 14 |

[1]PP is polypropylene.
[2]AMPACET 11748 is a mixture of 70% TiO$_2$/30% Linear Low Density Polyethylene.
[3]ULDPE is ultra low density polyethylene.
[4]LDPE is low density polyethylene.
[5]EAA is ethylene acetic acid.
[6]EMAA is ethylene methacrylic acid.
[7]EVA is ethylene vinyl acetate.

COMPARATIVE EXAMPLE A

Manufacture of flexible, plasticized PVC film

A flexible plasticized PVC film corresponding to the PVC backing used in 3M Cat. No. 231 adhesive tape was provided at a thickness of 0.076 mm. This PVC film was selected as representative of PVC films used for this type of application.

COMPARATIVE EXAMPLE B

An unfilled Surlyn TM 1702 resin was extruded without previously mixing with any component to a caliper of 0.102 mm.

STABILITY OF ELASTIC RECOVERY FROM DEFORMATION

Table I shows the elastic recovery of films over time for the films of Example 1 and Comparative Example A where the sample is held at 100% elongation for 5 minutes. These elastic recovery measurements are graphically presented in FIG. 7. Comparative Example A Elastic Recovery 40 is the elastic recovery curve of the PVC film prepared according to Comparative Example A over time. Example 1 Elastic Recovery 42 is the elastic recovery curve of the filled Surlyn TM resin prepared according to Example 1 over time.

Figure 7:
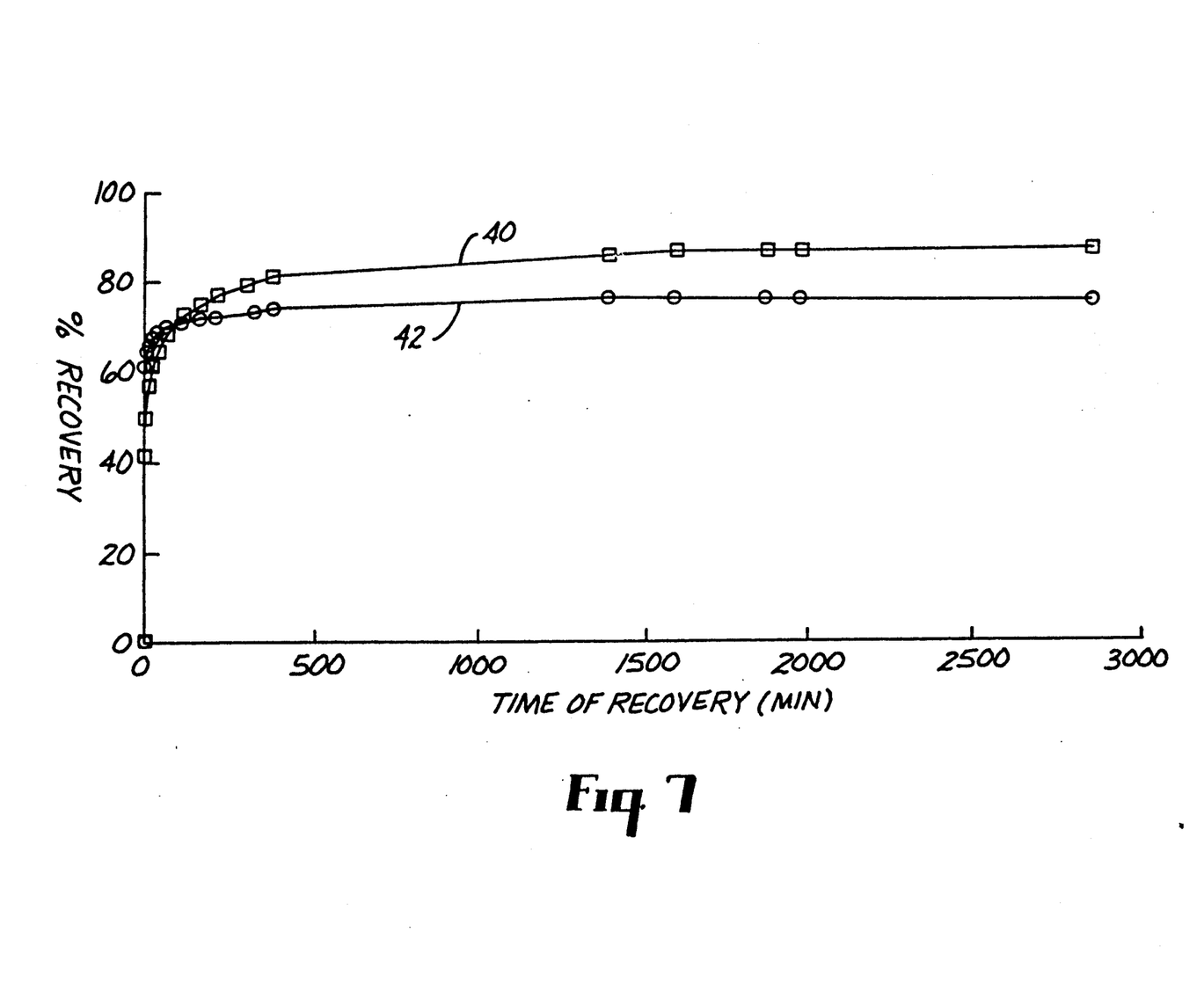
FIG. 7 is a graph comparing the elastic recovery over time of a film used with in the present invention with a PVC film.
Figure 8:
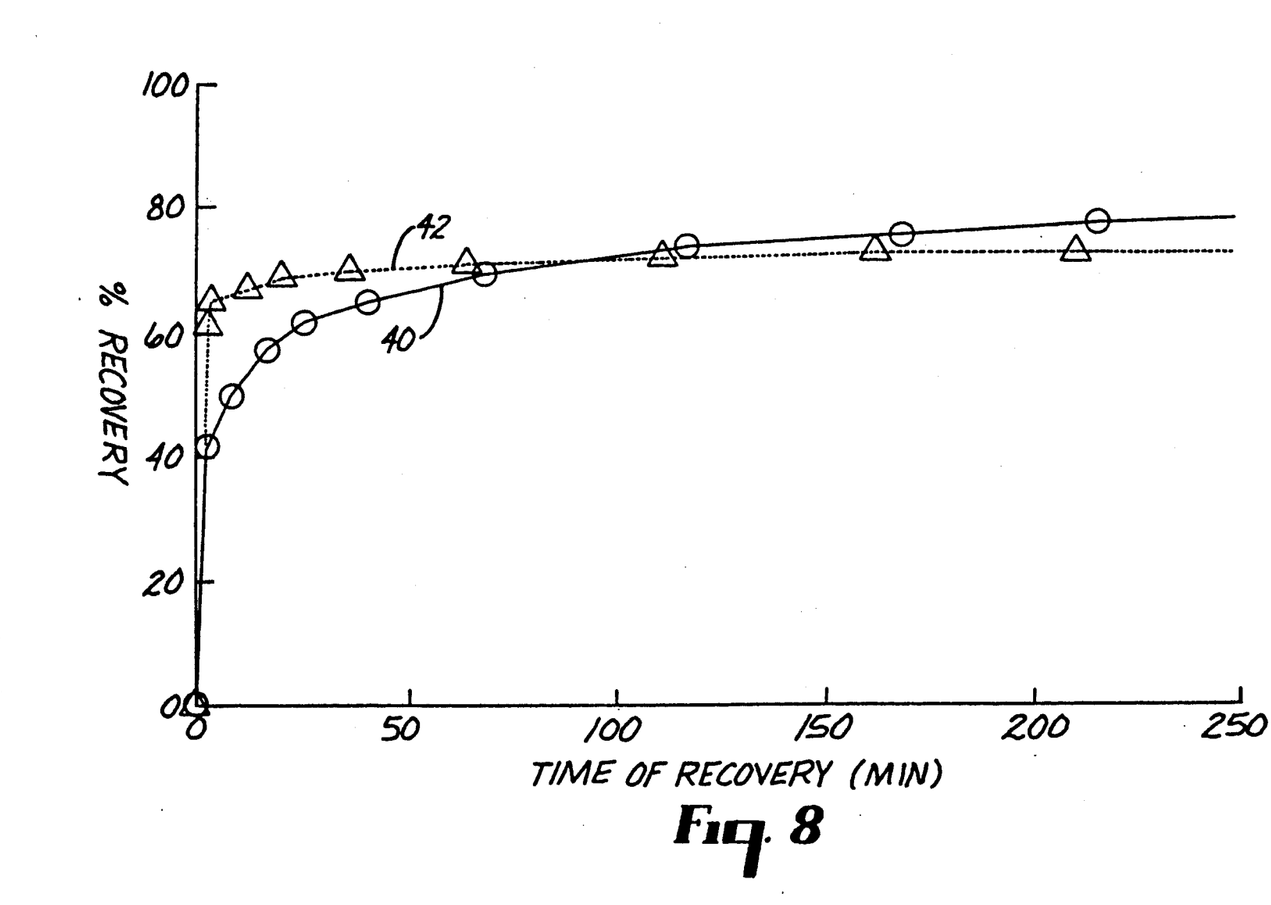
FIG. 8 is a closer view of the initial portion of the recovery curve shown in FIG. 7.

FIG. 8 shows a closer view of the graph of FIG. 7, so that the initial portion of the recovery curve is more clearly shown. While initially the film of Example 1 recovers faster, after about 90 minutes the film of Comparative Example A begins to recover more from the initial stretching.

From initial identical deformations (100%), Comparative Example A attains an equilibrium recovery of 87.5%, while Example 1 attains an equilibrium recovery of 75.9%. Although Comparative Example A initially does not recover as much (41.7% vs. 61.1%) as Example 1, Comparative Example A recovers at a faster rate (about 0.1%/min vs. 0.03%/min) and to a greater final extent. This greater recovery causes failure of adhesive composite products by creating stress in the adhesive layer, causing the adhesive to fail.

TABLE I

Elastic Recovery of Films

| Time (min) | % R Comparative Example A | % R Example 1 |
|---|---|---|
| 2 | 41.7 | 61.1 |
| 8 | 50.0 | 64.8 |
| 17 | 57.3 | 66.7 |
| 26 | 61.5 | 68.5 |
| 41 | 64.6 | 69.4 |
| 69 | 68.8 | 70.4 |
| 118 | 72.9 | 71.3 |
| 169 | 75.0 | 72.2 |
| 216 | 77.1 | 72.2 |
| 313 | 79.2 | 73.2 |
| 386 | 81.3 | 74.1 |
| 1400 | 85.4 | 75.9 |
| 1600 | 86.5 | 75.9 |
| 1878 | 86.5 | 75.9 |
| 1986 | 86.6 | 75.9 |
| 2850 | 87.5 | 75.9 |

In application where an adhesive composite is adhered to a surface, it is believed that Long-Term Elastic Recovery is more closely predicted by initially holding the sample in the extended state for a longer term. This is because in actual use in adhesive composites, the film is held in its extended state on the substrate by the adhesive.

After initial extension of the 50.8 mm×12.7 mm×0.105 mm sample film 100% in length at a rate of 508 mm/minute, the samples are held in the strained state for 10 minutes and then allowed to recover to equilibrium. The films of Example 1 and Comparative Example B were found to reach equilibrium by about 90 hours. The film of Comparative Example A at that time was still recovering slightly. Comparative Example B had the least amount of recovery under this test, about 6.67%, but is not very conformable as shown below. The film of Example 1 recovered only about 10.81%. The film of Comparative Example A recovered about 64.47%.

In the hysteresis test, a film sample 50.8 mm×12.7 mm×0.102 mm is clamped in a tensile testing machine. The sample is strained to a known final elongation (either 5% or 25%, which corresponds to 53.3 mm and 63.5 mm, respectively) at a rate of 305 mm/min. and immediately returned to zero elongation. The stress/strain curves in the sense of increasing and decreasing elongation then describe a hysteresis loop, and the area between these ascending and descending stress/strain curves is equal to the energy loss per deformation cycle, or the hysteresis.

In Table II, the hysteresis properties of Surlyn ™ 1702 films of varying thicknesses are compared to plasticized PVC. The PVC has greater hysteresis (the energy loss per cycle, or the amount of deformation that is non-recoverable), but the filled Surlyn ™ 1702 film is again somewhat similar.

TABLE II

Hysteresis of Films
Effect of Composition and Film Thickness

| Example | 5% Hysteresis (MJ/m$^3$) | 25% Hysteresis (MJ/m$^3$) |
|---|---|---|
| 3 | 0.036 ± 0.008 | 1.016 ± 0.134 |
| 4 | 0.039 ± 0.005 | 0.905 ± 0.052 |
| 5 | 0.029 ± 0.005 | 0.893 ± 0.066 |
| 6 | 0.048 ± 0.004 | 0.910 ± 0.126 |
| Comparative B | 0.003 | 0.635 |
| Comparative A | 0.142 ± 0.019 | 1.768 ± 0.174 |

Comparative Example B exhibits low hysteresis, attributed to a lack of filler in this sample. Unfilled ionomeric films thus are not very conformable.

In Table III, the mechanical properties of several vinyl-like films are compared. From the Table, films of the present invention are roughly twice as flexible as the PVC film of Comparative Example A, based on the modulus values. The tensile strength at yield is equivalent for both films, while the resistance to tear is significantly greater for the inventive films. Tear resistance relates to the ability of the film to be die-cut without further tearing at sharp corners.

Shrinkage of films is determined by following ASTM D 702-81 test, except that the temperature used was 66° C. The PVC film of Comparative Example A has about 2.5% machine direction shrinkage, compared with generally less than 1% machine direction shrinkage for the inventive films. This again demonstrates the greater mechanical stability of the ionomeric resin materials.

TABLE III

Mechanical Properties of Films

| Sample | Tensile Modulus | MD Tensile lbs. | CD Tensile lbs. | MD Tear gms. | CD Tear gms. | MD Shrink % | CD Shrink % |
|---|---|---|---|---|---|---|---|
| Example 8 | 26072 | 9.9 | 9.9 | 99.3 | 1600 | 0.505 | 0.082 |
| Example 9 | — | 12.1 | 10.7 | 21 | — | — | — |
| Example 11 | 20000 | 8.1 | 8.2 | 560 | 864 | 0.38 | 1 |
| Example 12 | 30872 | 13.6 | 13.1 | 51 | 67 | 1.18 | 0.1 |
| Example 15 | 28314 | 10.9 | 10.3 | 51.4 | 72 | — | — |
| Example 13 | 17293 | 7.9 | 6.6 | 88.4 | 720 | 1.91 | 0.045 |
| Example 14 | 9353 | 5.8 | 5.6 | 47 | 51 | 0.241 | 1.2 |
| Comparative Example A | 49000 | 8.8 | 8.6 | 180 | 255 | 2.5 | 1 |

APPLICATION OF IONOMERIC RESIN FILMS AS WALL DECORATION

The films of Example 1 and Comparative Example A were coated (335 mg/200 cm$^2$) with an adhesive comprising 75% (by weight) hollow microsphere adhesive (HMSA) in a binder of 25% Rohm & Haas N-1031 acrylic pressure sensitive latex adhesive. Sample strips approximately 2.4 meters long by 152–203 mm wide were cut from the films and adhered to a variety of textured wallboard surfaces painted with either Glidden Flat acrylic latex paint or Sears Semi-Gloss acrylic latex paint (both white paints). The sample strips were applied with hand pressure using a soft cloth or towel. The samples were tested in both hot (41° C.) and cold 10° C.) test chambers, as well as in a continuous testing facility kept at 29° C. Both films adhered well to smooth-textured flat and semi-gloss painted surfaces. However, Comparative Example A failed repeatedly when applied to a semi-gloss painted surface bearing any texture. Conversely, Example 1 performs very well on semi-gloss-painted textured surfaces. Also, the inventive material has better conformance on flat-painted surfaces.

The appliques 10 may be pre-cut into the shape of one or more scenic features such as trees, cars, aircraft, animals, personages, etc. On the side of the appliques 10 opposite the adhesive 14, there may be present indicia or a decorative image Preferably, the decorative imagery may be applied to the applique by any suitable process, including but not limited to, etching, embossing, flexographic printing, silk screening or gravure processes.

The decorative nature of an applique 10 can be enhanced by overlapping additional appliques thereon to provide details of the scenic feature to be depicted. For example, the dolphin shown in FIG. 1 can be an additional applique which is attached onto another dolphin to represent a pair of dolphins. Details can also be preprinted onto the appliques 10.

The versatility of the wall decorating system is greatly enhanced because appliques are provided for representing components or details of larger scenic features. A composite scenic feature is then created by positioning constituent component appliques 10 in adjacent or overlapping positions. For example, in FIG. 1, a dolphin, walrus, whale 16, sea turtle and shark can all be component appliques that combine with a sea backing sheet 12 to cooperatively define a seascape. These appliques 10 can advantageously be interchanged with other component appliques, thereby increasing the variety of decorative features which may be depicted using the present invention. The opportunity to build a detailed, decorative image using a plurality of complementary appliques provides an appealing, mess-free creative outlet for a young child.

The self-adherent appliques 10 conveniently press onto the backing sheets 12 to create a decorative wall scene, such as that shown in FIG. 1. The decorative scene can subsequently be changed by peeling off the appliques and repositioning them on or adjacent the backing sheets 12. The flexible nature of the appliques 10 allows them to be placed in overlapping relation with the backing sheet 12 as well as a wall 32 and/or an adjacent applique 10. The appliques 10 can be adhered to other surfaces of a room such as, but not limited to, furniture, doors, and windows so that the versatile wall decorating system is not limited to applique placement on the backing sheets 12.

The backing sheets 12 form a border or "backing" which provides a background for a basic theme. Each backing sheet 12 has a repositionable, pressure sensitive adhesive coating 14 (FIG. 2) on at least a portion of one side. The adhesive coating 14 allows the backing sheet to be easily and quickly pressed on and peeled off of the wall 32 without marring the wall surface. The adhesive coating 14 permits the backing sheet 12 to effectively cling to an underlying layer of paint 34 (FIG. 4) or wallpaper 36 (FIG. 5) in a detachable, non-damaging manner.

Preferably, a plurality of the backing sheets 12 are used in decorating a room. Generally, as an example not intended to be limiting, the backing sheets 12 may have a length of approximately fifteen feet, a width of about nine inches, and a thickness of between approximately 0.050 and 0.127 mm. Alternatively, the backing sheets may have a length of approximately twelve feet, a width of about seven and one-half inches, and a thickness of between approximately 0.050 and 0.127 mm.

These backing sheets 12 can be placed end-to-end to form a continuous border on all walls 32 of a room, as illustrated in FIG. 1. To achieve a continuous border, adjacent backing sheets 12 are abutted in corners of the room. The backing sheets 12 are preferably installed about three to five feet above floor level. When the wall decorating system is used in a small child's room, the backing sheets 12 should be affixed onto the walls 32 at a height enabling the child to reach and rearrange the decorative scene displayed thereon by the appliques 10.

The backing sheets 12 include decorative imagery or indicia on the side opposite the adhesive coating 14. Preferably, the decorative imagery provides a background pattern having a theme which complements a set of thematic appliques included with the wall decorating system. The decorative imagery or indicia may be applied to the backing sheet by any suitable process, including but not limited to, etching, embossing, flexographic printing, silk screening or gravure processes.

The background pattern and the appliques cooperatively define a decorative wall scene. The background pattern can show, for example, roads, railroad tracks, clouds, beach scenery, moon crater, etc. Alternatively, the backing sheets 12 can be a solid color free of decorative imagery, in which case the imagery of the decorative wall scene is provided solely by the appliques 10. Also alternatively, the backing sheets 12 can be transparent, in which case the imagery of the decorative wall scene may be self-applied or may be provided solely by the appliques 10.

Complementary applique sets and backing sheets are provided with themes that are age and gender oriented for use in children's rooms. Exemplary themes include spacecraft, sports, airplanes, space, dinosaurs, and transportation. The improved decorating system provides an effective way to decorate other rooms of a house as well by utilizing thematic appliques relating to, for example, various holidays or to the four seasons.

The present invention has now been described with reference to several embodiments thereof. It will be apparent to those skilled in the art that many changes can be made in the embodiment described without departing from the scope of the present invention. Thus the scope of the present invention should not be limited to the structure described in this application, but only by structures described by the language of the claims and the equivalents of those structures.

What is claimed is:

1. An improved wall decorating system comprising:
   a backing sheet having first and second sides with a portion of the first side coated with an adhesive and with the second side adapted to receive indicia;
   an applique having first and second sides with a portion of the first side coated with an adhesive and with the second side adapted to receive indicia;
   wherein the applique comprises a flexible and conformable film comprising:
   a) about 60–98% by weight ionomer resin that is a copolymer of ethylene and acrylic acid or methacrylic acid neutralized by a metal cation, said resin having a melt flow index greater than about 10 and
   b) about 2–40% by weight of a filler material, wherein said film has a thickness of between 0.050 and 0.127 mm, and
   wherein said film is substantially free of migrating plasticizers or leachable additives and wherein said film has an Elmendorf tear strength in excess of 280 grams/ply.

2. An improved wall decorating system according to claim 1, wherein said ionomeric resin is a copolymer of ethylene and methacrylic acid.

3. An improved wall decorating system according to claim 1, wherein said metal cation is selected from the group consisting of zinc, magnesium and sodium.

4. An improved wall decorating system according to claim 1, wherein said metal cation is zinc.

5. An improved wall decorating system according to claim 1, wherein said ionomer resin has a melt flow index of at least about 12.

6. An improved wall decorating system according to claim 1, wherein said film comprises between about 5 and 15% by weight of filler material.

7. An improved wall decorating system according to claim 1, wherein said filler material comprises a pigment.

8. An improved wall decorating system according to claim 1, wherein said filler material comprises a polymer selected from the group consisting of low density polyethylene polymers, high density polyethylene polymers, polypropylene polymers, polyoxyethylene copolymers and polypropylene/ethylene copolymers.

9. An improved wall decorating system according to claim 1, wherein said film is about 0.064 to 0.102 mm thick.

10. An improved wall decorating system according to claim 1, wherein said film is about 0.076 to 0.089 mm thick.

11. An improved wall decorating system according to claim 1, wherein said adhesive is a repositionable pressure-sensitive adhesive for repositionably adhering said film to a surface.

12. An improved wall decorating system according to claim 11, wherein said adhesive comprises
    a) between about 60-100% by weight of hollow, polymeric, acrylate, inherently tacky, infusible, solvent-insoluble, solvent-dispersible, elastomeric pressure-sensitive adhesive microspheres having a diameter of at least 1 micrometer, and
    b) between about 0-40% by weight of a non-spherical polyacrylate adhesive.

13. An improved wall decorating system according to claim 12, wherein said non-spherical polyacrylate adhesive is a copolymer of butyl acrylate and acrylonitrile.

14. An improved wall decorating system according to claim 12, wherein said non-spherical polyacrylate adhesive is present in the repositionable adhesive at an amount of about 10-35% by weight.

15. An improved wall decorating system according to claim 1, wherein said film exhibits a Long-Term Elastic Recovery of no more than 20% after 40 hours when 0.1 mm thick and initially held for 10 minutes.

16. An improved wall decorating system according to claim 1, wherein said film has a machine direction Elmendorf tear strength of greater than 300 g/ply when 0.076 mm thick.

17. An improved wall decorating system comprising:
    a backing sheet having first and second sides with a portion of the first side coated with an adhesive and with the second side adapted to receive indicia;
    an applique having first and second sides with a portion of the first side coated with an adhesive and with the second side adapted to receive indicia;
    wherein the backing sheet comprises a flexible and conformable film comprising:
    a) about 60-98% by weight ionomer resin that is a copolymer of ethylene and acrylic acid or methacrylic acid neutralized by a metal cation, said resin having a melt flow index greater than about 10 and
    b) about 2-40% by weight of a filler material, wherein said film has a thickness of between 0.050 and 0.127 mm, and
    wherein said film is substantially free of migrating plasticizers or leachable additives and wherein said film has an Elmendorf tear strength in excess of 280 grams/ply.

18. An improved wall decorating system according to claim 17, wherein said ionomeric resin is a copolymer of ethylene and methacrylic acid.

19. An improved wall decorating system according to claim 17, wherein said metal cation is selected from the group consisting of zinc, magnesium and sodium.

20. An improved wall decorating system according to claim 17, wherein said metal cation is zinc.

21. An improved wall decorating system according to claim 17, wherein said ionomer resin has a melt flow index of at least about 12.

22. An improved wall decorating system according to claim 17, wherein said film comprises between about 5 and 15% by weight of filler material.

23. An improved wall decorating system according to claim 17, wherein said filler material comprises a pigment.

24. An improved wall decorating system according to claim 17, wherein said filler material comprises a polymer selected from the group consisting of low density polyethylene polymers, high density polyethylene polymers, polypropylene polymers, polyoxyethylene copolymers and polypropylene/ethylene copolymers.

25. An improved wall decorating system according to claim 17, wherein said film is about 0.064 to 0.102 mm thick.

26. An improved wall decorating system according to claim 17, wherein said film is about 0.076 to 0.089 mm thick.

27. An improved wall decorating system according to claim 17, wherein said adhesive is a repositionable pressure-sensitive adhesive for repositionably adhering said film to a surface.

28. An improved wall decorating system according to claim 17, wherein said adhesive comprises
    a) between about 60-100% by weight of hollow, polymeric, acrylate, inherently tacky, infusible, solvent-insoluble, solvent-dispersible, elastomeric pressure-sensitive adhesive microspheres having a diameter of at least 1 micrometer, and
    b) between about 0-40% by weight of a non-spherical polyacrylate adhesive.

29. An improved wall decorating system according to claim 28, wherein said non-spherical polyacrylate adhesive is a copolymer of butyl acrylate and acrylonitrile.

30. An improved wall decorating system according to claim 28, wherein said non-spherical polyacrylate adhesive is present in the repositionable adhesive at an amount of about 10-35% by weight.

31. An improved wall decorating system according to claim 17, wherein said film exhibits a Long-Term Elastic Recovery of no more than 20% after 40 hours when 0.1 mm thick and initially held for 10 minutes.

32. An improved wall decorating system according to claim 17, wherein said film has a machine direction Elmendorf tear strength of greater than 300 g/ply when 0.076 mm thick.

* * * * *

UNITED STATES PATENT AND TRADEMARK OFFICE
CERTIFICATE OF CORRECTION

PATENT NO. : 5,196,246
DATED : March 23, 1993
INVENTOR(S) : Del A. Kauss, Patrick J. Hager and Janet T. Keller It is certified that error appears in the above-indentified patent and that said Letters Patent is hereby corrected as shown below:

Col. 2, line 37, delete "ν" insert --™--.
Col. 6, line 9, delete "oopolymers" insert --copolymers--.

Col. 11, line 20, delete "application" insert --applications--.
Col. 11, line 66, delete "thioknesses" insert --thicknesses--.
Col. 12, line 23, delete "resistanoe" insert --resistance--.
Col. 13, line 8, after "image" insert --.--.

Signed and Sealed this

Thirty-first Day of May, 1994

Attest:

BRUCE LEHMAN

*Attesting Officer*   *Commissioner of Patents and Trademarks*